United States Patent Office 3,664,755
Patented May 23, 1972

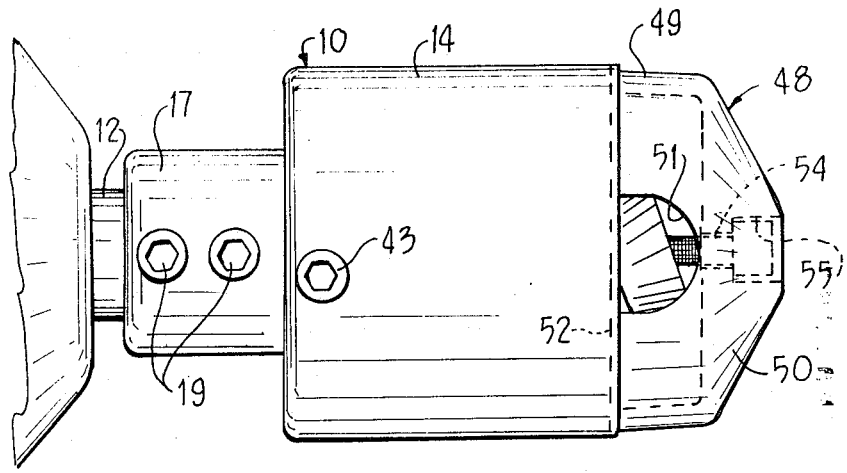
Fig-1
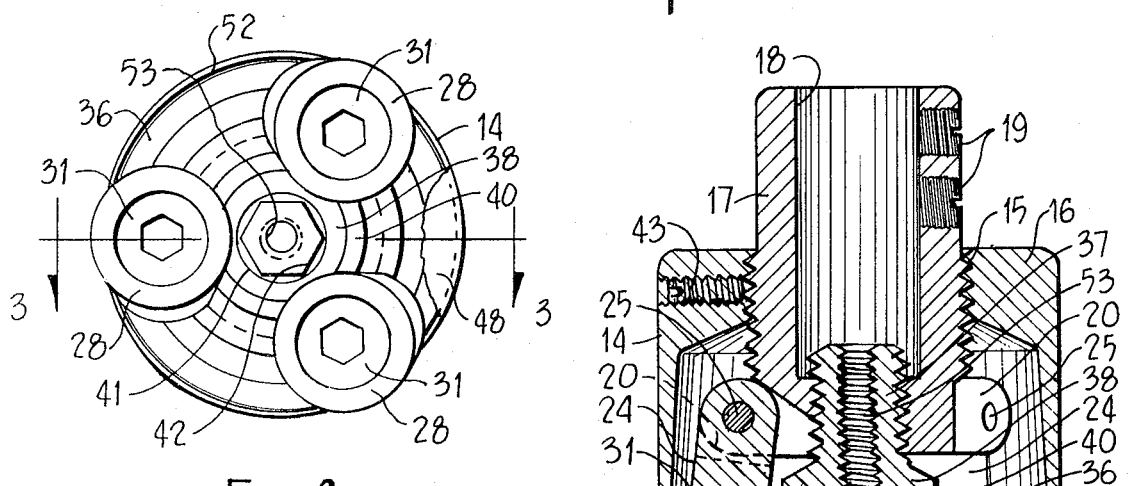
Fig-2
Fig-3
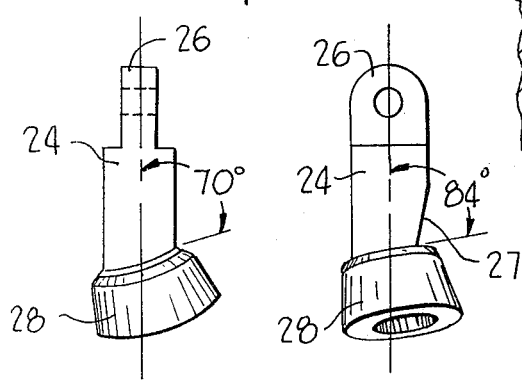
Fig-4
INVENTOR.
LEROY J. CARNS

3,664,755
FINISHING BORING HEAD
Leroy J. Carns, Castro Valley, Calif., assignor to The Singer Company, New York, N.Y.
Filed Dec. 2, 1970, Ser. No. 94,306
Int. Cl. B23b 29/034
U.S. Cl. 408—159
10 Claims

ABSTRACT OF THE DISCLOSURE

A cutting head for reaming circular apertures to close tolerances. A cluster of three equiangularly spaced truncated conical cutters are mounted for adjustment within a cylindrical supporting head. The cluster is adjustable axially of the head to control the inside diameter of the apertures and each cutter of the cluster is adjustable by rotation thereof to expose a new cutting edge as required.

BACKGROUND OF THE INVENTION

Field of the invention

This invention relates to boring or reaming tools and more particularly to a reaming tool having a series of adjustable cutters supported in a cylindrical head. Each cutter is adjustable to expose each of a plurality of new sharp cutting edges as a cutting edge becomes worn. Also, the cutters, as a cluster, are adjustable for diametral control of the inner peripheral surface of an aperture to be reamed in a casting or in a molding of a plastic material such as a glass filled resin.

Description of prior art

In conventional boring bits or heads of the same general type as that of the present invention, each cutter of the series of cutters is rotatably mounted therein on ball or roller bearings which carry both the radial load and axial thrust. Such drill bits are adapted for use in the boring of wells in earth and rock. Each cutter of most of the series of cutters has one or more circumferential rows of teeth thereon while the cutters of other series of cutters are provided with inserts of tungsten carbide. Also, in some of the boring or reamer heads, the cutters are retractable from an operating diametral position to enable the removal of the head through the well casing.

Other types of conventional reamers for "cleaning up" or enlarging circular apertures in metal, plastics and the like are generally fluted rods with either straight or spiral flutes. If a reamer of a fluted type is to be used for holes varying in diameter and within given limits, an adjustable reamer is used. Such a reamer comprises a rod which is provided with a series of lengthwise parallel slots into which cutting blades of rectangular cross-section are inserted. A pair of nuts are threaded onto the rod, one at each end of the blades, and, upon turning one nut toward the other, the blades are bowed for adjustment from a minimum to a maximum diameter. As the blades wear and become dull they must be replaced. They are also subject to stresses which cause them to be easily broken.

SUMMARY OF THE INVENTION

According to this invention, the rotary cutting head comprises a cup-like member, the inner wall surface of which tapers inwardly toward the bottom. An opening is provided in the bottom of the cup-like member, axially thereof, for the threaded engagement of a mandrel therein. The mandrel carries three equiangularly spaced radial lugs, each of which lugs pivotally supports an arm rockable radially of the mandrel. Each of the arms, at its free end extremity, is provided with a flat surface to which a truncated conical cutter is adjustably secured, the larger diametral edge of the cutter serving as the cutting edge. As the mandrel is threaded in and out axially of the cup-like member, the peripheral surface of the conical cutters moves along the tapered inner wall of said member to control the cutting diameter of the cutters. A centralizer is threaded into the mandrel axially thereof and serves to retain the peripheral surface of the cutters in contact with the tapered wall of the cup-like member upon each axial adjustment of said mandrel.

By means of this construction, the cutting diameter of the equiangularly spaced cutters is selectively controlled within given limits by the axial adjustment of the mandrel. At the same time, the inside diameter of the opening being reamed may be held to close tolerances due to the fact the conical cutters are securely retained in contact with the inner wall surface of the cup-like member. Also, the surface of the reamed opening is smooth because of the shearing action of the cutters.

Accordingly, it is an object of the present invention to provide a boring head having a series of cutters, each adaptable for selective adjustment to present each of a plurality of new cutting edges.

It is another object of the present invention to provide an improved boring head in which a series of cutters are adjustable for the inside diametral control of an opening and each cutter is selectively adjustable to present each of a plurality of new cutting edges.

Other objects and advantages will appear in the following description of a preferred embodiment as illustrated in the accompanying drawings, in which:

FIG. 1 is a horizontal elevational view of the rotary cutting head secured in place on a motor shaft;

FIG. 2 is an elevational view of the cutter end of the head with the shield removed;

FIG. 3 is a sectional elevational view axially of the cutting head, the view being taken on the plane indicated by line 3—3 in FIG. 2; and FIG. 4 is an illustration showing two elevational views of a conical cutter and its supporting arm, one elevational view rotated 90° from the other to show the two angles of the cutter relative to the supporting arm.

DESCRIPTION OF THE PREFERRED EMBODIMENT

Referring to FIG. 1 of the drawing, the rotary cutting head is generally shown at 10 secured on an electric motor shaft 12 for rotation in a clockwise direction, as viewed from the right. The cutting head 10 comprises a cup-like member 14 (FIGS. 1, 2 and 3) having an axially disposed threaded opening 15 in the bottom portion 16 thereof. The cup-like member 14 is coaxially supported on a mandrel 17 by a threaded engagement therewith. For a major portion of its length, the mandrel 17 is provided with a cylindrical bore 18, concentric with the cup-like member 14, and is adapted to be secured on a motor shaft extension or a lathe arbor 12 by means of a pair of set-screws 19. The workpiece is moved relative to the cutting head or the cutting head with the motor may be moved relative to the workpiece. It will be noted, however, that the cutting head may be non-rotatably supported on a bar in a lathe with the cutting head movable axially relative to a rotating workpiece.

At its closed end within the mmeber 14, the mandrel 17 carries three equiangularly spaced radial lugs 20 integrally formed thereon. Each of the lugs 20 is bifurcated to pivotally support an arm 24 by means of a pin 25. The arms 24 are substantially round with a flatted center end portion 26 (FIG. 4) having a close fit within the bifurcation of the corresponding radial lugs 20. Adjacent the free end of each arm 24, a flatted or canted surface 27 is formed angularly to the center line of the arm, on the right in FIG. 4, for a purpose to be explained hereinafter.

The three arms 24 form a spider or cluster including three truncated conical cutters 28 secured for rotatable adjustment on the extreme free end surface of the arms 24. The end surface of each arm 24 is formed at a compound angle. The first angle of this compound angle is approximately 70° to the longitudinal center line of the arm, as viewed on the left in FIG. 4, with the acute angle thus formed being in the direction of rotation of the cutting head 10, clockwise in FIG. 2. The second angle forming the compound angle is at 84° to the center line (FIG. 4), the acute angle thus formed being toward the center of the cup-like member 14 and at 90° to the first angular surface. The compound angle of each of the cutters 28 ensures that, as a workpiece 32 (FIG. 3) is moved toward the rotating cutting head 10, an arcuate portion of the larger diametral edge of each of the cutters engages the material to be removed in a manner such that a shearing action takes place. By this means, the reamed surface of the bore in workpiece 32 is smooth.

For the purpose of securing the cutters 28 to the corresponding arms 24, each cutter is provided with an aperture 29 axially thereof and a suitable counter-bore 30 in the larger diametral end of the cutter. A screw 31, preferably of the socket head type, is passed through the aperture 29, having a close fit therewith, to secure the cutter 28 in place with the smaller diametral end against the angular end surface of the corresponding arm 24. As wear develops in the arcuate cutting portion of the diametral edge of the cutters 28, the cutters are rotated approxiamtely 22½° to move a new arcuate portion of the cutting edge into cutting position. Such adjustments of the cutters may be made as many as sixteen times before the cutters are removed for grinding.

In order to control the diametral adjustment of the cluster of cutters 28, the mandrel 17 is rotated clockwise, as viewed from the bottom in FIG. 3. As the cluster moves into the cup-like member 14, the cutters 28 follow the inner surface 36 of the wall of the cup-like member, the inner surface of the wall having a taper inwardly of approximately 2°. Upon counter-clockwise rotation of the mandrel 17, as viewed from the bottom in FIG. 3, the cutters 28 move outwardly of the cup-like member 14 and the diameter of the cluster of cutters is expanded.

Following the threaded adjustment of the mandrel 17, the cutters 28 are maintained in tangential contact with the inner surface 36 of the wall of the cup-like member 14. For this purpose, a retainer 37 is threaded for adjustment in the closed inner end of the mandrel 17 axially thereof. The circular head 38 of the retainer 37 is provided with an annular groove 39 within which a ring or tire 40 is carried, the tire 40 preferably being of a hardened material such as tool steel. On the top surface of the head 38 and centrally thereof, a circular boss 41 is formed having a hexagonal socket recess 42 therein (FIG. 2) adapted to receive an instrument to control the adjustment of the retainer 37.

When it becomes desirable to change the diameter of the cutter cluster, the retainer 37 is first turned out of the mandrel 17 sufficiently to free the arms 24 for radial movement. Thereafter, the mandrel 17 is adjusted for the desired cluster diameter and the mandrel is then secured in its adjusted position by any suitable means such as a set-screw 43 (FIGS. 1 and 3). Following the adjustment of the mandrel 17, the arms 24 and the corresponding cutters 28, carried thereby, are unyieldingly held in tangential contact with the inner surface 36 of the wall of the cup-like member 14 by the retainer 37. As the retainer is turned into the mandrel 17, the tire 40 engages the flat canted surface 27 of each of the arms 24 urging the cutters 28 radially outwardly for retention against the tapered wall surface 36 of the cup-like member 14.

In order to prevent injury to an operator, the rotary cutting head 10 is provided with a shield 48 (FIG. 1) having a cylindrical body 49 and a substantially conical nose portion 50. Shield 48 is provided with three equiangularly spaced semicircular openings 51 through which the arcuate cutting edge portion of the respective cutters 28 protrudes. For mounting the shield 48, a rabbet 52 is formed in the edge of the wall at the open end of the cup-like member 14 and is adapted for engagement by the cylindrical body 49 of the shield. In order to secure the shield 48 in place, an axially disposed threaded aperture 53 (FIGS. 2 and 3) is provided in the retainer 37 and is engaged by a machine screw 54 which is passed through a suitable opening in the conical portion of the shield. The head of the screw 54 is recessed in a counterbore 55 formed at the vertex of the conical portion 50 of the shield.

What is claimed is:

1. A boring head comprising in combination:
   a cup-like member having an inner wall surface tapered inwardly and an axially disposed aperture in the closed end portion thereof,
   a mandrel engaged in said aperture for adjustment axially of said member,
   means for locking said mandrel in each adjusted position,
   cutter means carried by said mandrel rockable radially for engagement with said tapered inner wall surface of said cup-like member and movable along said tapered surface upon adjustment of said mandrel to control the cutting diameter of said cutter means, and
   means associated with said mandrel adjustable axially thereof for retaining said cutter means in engagement with said inner wall of said cup-like member in each axially adjusted position of said mandrel.

2. In a device of the character described in claim 1 wherein said mandrel is tubular and includes a plurality of radially disposed lugs equiangularly arranged thereon and adapted to pivotally support said cutter means for radial adjustment within said cup-like member upon adjustment of said mandrel in the aperture in said member.

3. In a device of the character described in claim 2 wherein said cutter means comprises:
   a plurality of levers, one for each of said lugs, pivotally secured thereon at a common radius for rocking movement radially of said mandrel,
   a series of truncated conical cutters each having an annular cutting edge on the larger diametral surface thereof, one of said cutters for each of said levers,
   each of said levers having the surface of the free end extremity thereof formed at a first acute angle to the center line thereof in a direction radially inward of said mandrel and formed at a second acute angle to said center line in the direction of rotation of said head, and
   means for securing each of said cutters for rotatable adjustment on said free end surface of the respective ones of said levers with the smaller diametral end surface of each cutter in contact with said free end surface and an arcuate portion of the outer wall of each said cutter maintained by said retaining means in tangential contact with said inner wall surface of said cup-like member.

4. In a device of the character described in claim 3 wherein said first acute angle is of the order of about 84° and said second acute angle is of the order of about 70°.

5. In a device of the character described in claim 1 wherein said aperture in said cup-like member is provided with an internal screw thread and said mandrel includes a threaded portion for engagement with said internal screw threads.

6. In a device of the character described in claim 1 wherein said inner wall surface of said cup-like member is tapered to the order of about 2°.

7. In a device of the character described in claim 1 wherein said locking means comprises at least one screw member threaded radially in said closed end portion of said cup-like member for locking engagement with said mandrel subsequent to the adjustment of said mandrel in said aperture.

8. In a device of the character described in claim 3 wherein said retaining means comprises a screw-like member threaded for adjustment into and out of said mandrel axially thereof and having a circular head portion adapted for engagement with the wall surface of each of said levers to move said cuppers radially outwardly subsequent to the adjustment of said mandrel and upon adjustment of said screw-like member into said mandrel.

9. In a device of the character described in claim 8 wherein said screw-like member includes an annular groove in said circular head portion, and
   a tire disposed in said groove engaging the wall surface of each of said levers to control the radial outward adjustment of said cutters.

10. In a device of the character described in claim 9 wherein said tire is hardened tool steel.

References Cited

UNITED STATES PATENTS

| | | | |
|---|---|---|---|
| 1,331,138 | 2/1920 | Baldwin | 408—172 |
| 2,383,958 | 9/1945 | De Vlieg | 408—187 X |
| 2,480,595 | 8/1949 | Moyer et al. | 408—159 |
| 2,998,737 | 9/1961 | Yogus et al. | 408—180 X |
| 3,256,755 | 6/1966 | Kraus | 408—157 X |

ANDREW R. JUHASZ, Primary Examiner

Z. R. BILINSKY, Assistant Examiner

U.S. Cl. X.R.

408—172; 166—55.7; 175—384